3,531,571
METHOD AND COMPOSITION FOR REGULATING ANIMAL GROWTH

Frank E. Halleck, Wayzata, Minn., assignor to The Pillsbury Company, Minneapolis, Minn., a corporation of Delaware
No Drawing. Continuation-in-part of application Ser. No. 149,857, Nov. 3, 1961. This application Aug. 14, 1963, Ser. No. 301,997
Int. Cl. A61k 27/00
U.S. Cl. 424—265   23 Claims

ABSTRACT OF THE DISCLOSURE

A composition for stimulating animal growth which contains an animal feed and a peristalsis-regulating substance, specifically a parasympatholytic or anti-chlorinergic agent.

---

The present invention relates generally to animal feeding and more particularly to novel methods and compositions for regulating the rate of growth and/or the efficiency of feed conversion in animals.

This application is a continuation-in-part of co-pending application Ser. No. 149,857 now abandoned, filed Nov. 3, 1961 for Method and Composition for Accelerating Animal Growth.

In the production of animals such as cattle, lambs, hogs, and poultry for market, it is economically advantageous for the producer if animal growth occurs as rapidly as possible. If the rate of growth can be stimulated, a producer can attain a greater profit without an increase in capital outlay. Thus, substances which accelerate growth are highly desirable supplements for animal feeds.

Moreover, it is well known in animal nutrition that efficiencies of feed conversion (i.e. weight of feed consumed per unit weight of flesh added by an animal) presently attained in animal feeding is far below the maximum which is theoretically obtainable if the animal could fully utilize the total nutritive value of the feed which it consumes. For this reason, considerable research activity in animal nutrition in recent years has been directed toward increasing feed conversion efficiency.

In the past, animal growth has been stimulated by administering to animals, in conjunction with their feed, substances such as antibiotics and estrogenic compounds. With respect to the latter, Burroughs, U.S. Pat. No. 2,751,303 teaches that animal growth may be stimulated by administering such estrogenic substances as stilbestrol and estradiol. While some degree of success has been achieved by these prior methods, the results have not been entirely satisfactory, especially with respect to side effects which have been encountered.

In certain situations, it may be desirable to inhibit the rate of growth and/or the efficiency of feed conversion in animals. For example, in the area of egg production, it is generally desirable to maintain the weight of the laying hens as low as possible during maturation. Obesity in domestic pets of all types is an additional problem.

It is, therefore, an object of the present invention to provide novel methods and compositions for regulating animal growth.

Another object of the invention is to provide novel methods and compositions for accelerating growth of animals.

Another object of the invention is to provide novel methods and compositions for increasing feed conversion efficiency in animals.

Another object of the invention is to provide novel methods and compositions for inhibiting animal growth and/or feed conversion efficiency.

A further object of the invention is to provide novel methods and compositions for increasing feed conversion efficiency in animals without deleterious side effects.

A still further object of the invention is to provide an increase in feed conversion efficiency in animals without impairing the quality of the meat resulting therefrom.

Other objects will become apparent in the following description of the invention and the claims appended thereto.

In accordance with the principles of the present invention, the aforementioned objects may be attained by administering to animals during their growth period small amounts of substances which slow down peristaltic action in the gastro-intestinal tract, thereby providing an increased retention time of food within the animal and at certain dosages a concomitant increase or decrease in rate of growth and/or feed conversion efficiency. As will be brought out in further detail hereinafter, inhibition may be accomplished at dosages which generally are substantially higher than those which are stimulative. Although any substance which inhibits peristalsis will provide the desired result, preferably substances which are highly specific for the smooth gastro-intestinal muscles which produce peristalsis should be used. Preferably the substance used should not materially affect digestive enzymes and should not have other deleterious side effects. Although the mechanism by which the present invention operates to provide increases in growth is not fully understood at the present time, it is believed that the aforementioned peristalsis-inhibiting substances provide an increase retention time for food within an animal, thereby allowing the digestive process to proceed to a higher degree of completion than known heretofore. It is also possible that at least a portion of the effect of compositions within the scope of the invention may be attributable to an increased rate of assimilation in the gastro-intestinal tract.

Suitable substances which may be used in practicing the invention include atropine; methantheline bromide, obtainable commercially under the trademark "Banthine" bromide; and propantheline bromide, obtainable commercially under the trademark "Pro Banthine" bromide. In addition, aminopentamide sulfate; dibutoline sulfate; dicyclomine hydrochloride; hexocyclium methyl sulfate; isopropamide iodide; methscopolamine bromide; methscopolamine nitrate; oxyphenonium bromide; mepenzolate bromide; penthienate bromide; pipenzolate methylbromide; piperidolate hydrochloride; tricyclamol chloride; valethamate bromide; homatropine; and eucatropine hydrochloride may suitably be used. Many of these compounds have derivatives which function in a manner similar to the parent compound. All of the above substances are parasympatholytic agents, sometimes called cholinergic blocking or anticholinergic agents, which afford a reduction in peristaltic action.

Other possible classes of compounds include sympathomimetic agents, of which ephedrine and epinephrine are examples, and smooth muscle depressants, of which papaverine is an example.

The present invention is applicable to all types of animals and poultry. Both ruminants, such as sheep and cattle, and nonruminants, such as hogs and rabbits, may be beneficially treated as described above. In addition, poultry, such as ducks, geese, and chickens, may be advantageously fed. The aforementioned peristalsis-inhibiting substances may be administered in any convenient manner. For example, the substances may be administered orally in the form of liquid, tablets, or powder, mixed with the animal feed or any portion thereof, or mixed with the animal drinking water. Alternatively, parenteral administration, as for example by injection, may be used.

The dosage of compounds within the scope of the invention varies from one compound to another. For example, whereas propantheline bromide may be advantageously administered to lambs at a dosage of 0.5 to 1.0 mg./lb. of body weight per day, homatropine, being more potent, might be administered at a much lower rate, e.g. 0.1 to 0.2 mg./lb. body weight per day. As a general rule, the dosage for a given drug should be somewhat less than the prescribed therapeutic dosage in humans.

With respect to several of the compounds, it has been observed that starting with a zero dosage the effectiveness of the compounds increases with dosage until an optimum is reached. Thereafter, as the dosage is increased the effectiveness decreases. In some cases, inhibition of growth has been observed. There is, of course, a toxic dosage for all compounds within the invention.

It is presently believed to be desirable to maintain a constant dosage (mg. weight of chemical per unit weight of animal) throughout the growth cycle of an animal. Since generally the rate of feed consumption per pound of animal body weight changes (generally decreases) with growth, the concentration of a compound in feed, if administered in that manner, should be adjusted as the animal grows. Such adjustments are well known in the art with respect to prior additives, such as antibiotics.

However, as to certain drugs, it has been observed in experimentation that drug effectiveness varies during the growth cycle. For that reason, upon further study, it may be found desirable to vary dosage throughout the growth cycle, even to the point of eliminating treatment completely during certain critical periods.

The additives of the present invention may be used singly or in combination. Moreover, the additives or combinations thereof may also be used with other well-known additives of the prior art.

As illustrative of several ways in which the present invention may be practiced and the results obtainable therefrom, the following examples are offered:

EXAMPLE I

Twelve weanling lambs having approximately the same weight and general physical condition were selected and divided into three groups, each containing four lambs. One group was designated the control group, the second group was given 30 mg. of propantheline bromide per day, and the third group was given 60 mg. of propantheline bromide per day. All three groups were fed a normal lamb diet of grain and hay. The second and third group, as was stated above, were given propantheline bromide orally in tablet form each morning during the experiment which lasted 70 days. The table which appears below summarizes the results of the experiment.

TABLE 1

|  | Group I [1] | Group II [2] | Group III [3] |
|---|---|---|---|
| Weight gain (lbs.) | (1) 17.5 | (5) 20.0 | (9) 17.5 |
|  | (2) 18.5 | (6) 30.0 | (10) 25.0 |
|  | (3) 19.5 | (7) 24.0 | (11) 22.5 |
|  | (4) 17.0 | (8) [4] | (12) 23.5 |
| Feed consumed during experiment: |  |  |  |
| Hay (lbs.) | 364 | 336 | 364 |
| Grain (lbs.) | 406 | 357 | 406 |
| Average gain (lbs.) | 18.1 | 24.7 | 22.1 |

[1] No propantheline bromide.
[2] 30 mg. propantheline bromide per day.
[3] 60 mg. propantheline bromide per day.
[4] Lamb No. 8 died in the 7th week of experiment from acute bloat. An autopsy revealed that this condition was not caused by the administration of propantheline bromide. At death the lamb was significantly heavier than any of the four lambs in the control group (Group I).

From Table 1 it can be seen that Group II gained an average of greater than 36 percent more weight than Group I and that Group III on the average gained greater than 22 percent more weight than Group I. It should be noted that the amount of feed consumed by Group III was equal to, and the amount consumed by Group II was less than, the amount consumed by the control group. This illustrates not only an acceleration in growth rate but also a substantial increase in feeding efficiency.

The condition of the lambs in Groups II and III was observed throughout the experiment. No unusual thirst, increase in appetite, fright or nervousness was detected. Moreover, all lambs had normal stools. In all respects the lambs in Groups II and III appeared and behaved in the same manner as the animals in the control group.

EXAMPLE II

At the termination of the experiment described in Example I, the lambs were graded by an experienced and qualified lamb grader who had no knowledge of the experimental conditions. Table 2 below summarizes the results of this grading. The number assigned each lamb in Table 2 corresponds to the numbers assigned in Table 1.

TABLE 2

| Finish rank | Lamb No. | Grade |
|---|---|---|
| 1 | (10) 60 mg | Choice. |
| 2 | (11) 60 mg | Do. |
| 3 | (9) 60 mg | Low choice. |
| 4 | (6) 30 mg | Do. |
| 5 | (12) 60 mg | Do. |
| 6 | (7) 30 mg | High Good. |
| 7 | (4) Control | Do. |
| 8 | (5) 30 mg | Good. |
| 9 | (1) Control | Do. |
| 10 | (2) Control | Do. |
| 11 | (3) Control | Do. |
| 12 |  |  |

From Table 2 it may be seen that Groups II and III ranked significantly higher than the lambs of the control group.

EXAMPLE III

Sixty weanling lambs (30 ewes and 30 wethers) having approximately the same weight and general physical condition were selected and divided into five groups, each containing twelve lambs, six of each sex. One group was designated the control group, the second group was given 15 mg. of propantheline bromide per day, the third group given 30 mg. per day, the fourth group given 45 mg. per day, and the fifth group given 60 mg. per day. The animals were maintained in separate pens and fed individually over a period of 16 weeks. The daily dose of propantheline bromide for the second through the fifth groups was mixed with 90 grams of soybean meal and fed to each animal early each morning before any other feed was offered. Lambs in the control group received 90 grams of plain soybean meal each day. After consumption of the soybean meal, the animals were allowed to consume the regular lamb ration and water ad libitum. The following is a standard lamb ration:

|  | Percent |
|---|---|
| Suncured alfalfa (13%) | 55.0000 |
| Ground corn | 30.7325 |
| Trace mineral mix [1] | 0.1000 |
| Iodized salt | 0.5000 |
| Vitamin A mix [2] | 0.1500 |
| 44% soybean meal | 4.0000 |
| Molasses | 7.0000 |
| Vitamin $D_3$ mix [3] | 0.0175 |
| Defluorinated phosphate | 0.5000 |
| Bentonite | 2.0000 |
|  | 100.0000 |

[1] Trace mineral mix contains manganous oxide, ferrous carbonate, potassium iodide, cupric oxide, cobalt sulfate, zinc oxide, all of which are distributed on calcium carbonate.
[2] Vitamin A mix contains vitamin A palmitate with 408,600 units per lb.
[3] Vitamin $D_3$ mix contains 681,000 unitts of $D_3$ per lb. of soybean meal.

The lambs were weighed bi-weekly and the amount of feed consumed was recorded. At the end of the trial, the animals were graded on the hoof by a licensed animal grader who had no knowledge of the testing procedure. The following tables summarize the results of the experiment at the end of sixteen weeks.

TABLE 3a

| Lamb No. | Group No. | Propantheline bromide administered (mg./day) | Initial weight (lb.) | Total feed consumption (lb.) | Total weight gain (lbs.) | Feed conversion (lbs. feed consumed/lbs. gained) | Grade |
|---|---|---|---|---|---|---|---|
| 1(E) [1] | I | 0 | 62.0 | 359 | 39.0 | 9.2 | Prime. |
| 2(W) [2] | II | 15 | 66.5 | 353 | 40.5 | 8.7 | Do. |
| 3(E) | III | 30 | 66.0 | 363 | 45.5 | 8.0 | Do. |
| 4(W) | IV | 45 | 64.0 | 376 | 58.0 | 6.5 | Do. |
| 5(E) | V | 60 | 61.0 | 348 | 45.0 | 7.7 | Do. |
| 6(W) | I | 0 | 68.0 | 351 | 42.0 | 8.4 | Do. |
| 7(E) | II | 15 | 61.5 | 372 | 45.5 | 8.2 | Do. |
| 8(W) | III | 30 | 64.0 | 385 | 50.0 | 7.7 | Low choice. |
| 9(E) | IV | 45 | 64.0 | 344 | 34.5 | 10.0 | Do. |
| 10(W) | V | 60 | 64.0 | 315 | 36.0 | 8.8 | Do. |
| 11(E) | V | 60 | 61.0 | 343 | 41.5 | 8.3 | Prime. |
| 12(W) | III | 30 | 69.5 | 370 | 49.5 | 7.5 | Do. |
| 13(E) | I | 0 | 66.5 | 372 | 44.5 | 8.4 | Do. |
| 14(W) | IV | 45 | 65.5 | 375 | 46.0 | 8.2 | Choice. |
| 15(E) | II | 15 | 71.0 | 371 | 46.0 | 8.1 | Prime. |
| 16(W) | V | 60 | 69.5 | 369 | 43.5 | 8.5 | Low choice. |
| 17(E) | IV | 45 | 61.0 | 384 | 52.0 | 7.4 | Prime. |
| 18(W) | I | 0 | 70.0 | 378 | 46.0 | 8.4 | Do. |
| 19(E) | III | 30 | 66.0 | 370 | 45.0 | 8.2 | Do. |
| 20(W) | II | 15 | 62.0 | 341 | 53.0 | 6.4 | Low choice. |
| 21(E) | I | 0 | 63.5 | 377 | 46.5 | 8.1 | Prime. |
| 22(W) | V | 60 | 66.0 | 343 | 40.0 | 8.6 | Do. |
| 23(E) | III | 30 | 69.5 | 334 | 45.5 | 7.3 | Do. |
| 24(W) | II | 15 | 71.0 | 360 | 46.0 | 7.8 | Low choice. |
| 25(E) | IV | 45 | 65.0 | 340 | 40.0 | 8.5 | Prime. |
| 26(W) | I | 0 | 67.0 | 356 | 44.0 | 8.1 | Do. |
| 27(E) | V | 60 | 62.0 | 356 | 45.0 | 7.9 | Do. |
| 28(W) | IV | 45 | 60.0 | 377 | 51.0 | 7.4 | Do. |
| 29(E) | II | 15 | 65.0 | 333 | 40.5 | 8.2 | Do. |
| 30(W) | III | 30 | 66.5 | 360 | 46.0 | 7.8 | Do. |
| 31(E) | II | 15 | 64.0 | 355 | 44.0 | 8.1 | Do |
| 32(W) | V | 60 | 71.0 | 389 | 55.0 | 7.1 | Do. |
| 33(E) | I | 0 | 66.0 | 386 | 49.5 | 7.8 | Do. |
| 34(W) | III | 30 | 65.0 | 370 | 49.0 | 7.4 | Do. |
| 35(E) | IV | 45 | 70.0 | 348 | 52.0 | 6.7 | Do. |
| 36(W) | II | 15 | 67.0 | 396 | 47.0 | 8.4 | Choice. |
| 37(E) | V | 60 | 68.0 | 327 | 35.0 | 9.4 | Prime. |
| 38(W) | IV | 45 | 72.0 | 347 | 47.0 | 7.4 | Low choice. |
| 39(E) | III | 30 | 61.5 | 333 | 44.5 | 7.5 | Prime. |
| 40(W) | I | 0 | 63.0 | 341 | 46.0 | 7.4 | Do. |
| 41(E) | III | 30 | 63.0 | 366 | 40.0 | 9.2 | Do. |
| 42(W) | I | 0 | 71.0 | 329 | 38.5 | 8.4 | Do. |
| 43(E) | V | 60 | 66.0 | 370 | 47.0 | 7.9 | Do. |
| 44(W) | IV | 45 | 68.5 | 365 | 52.5 | 7.0 | Choice. |
| 45(E) | II | 15 | 66.0 | 373 | 44.0 | 8.5 | Prime. |
| 46(W) | V | 60 | 61.0 | 345 | 44.5 | 7.8 | Low choice. |
| 47(E) | IV | 45 | 62.0 | 346 | 46.0 | 7.5 | Prime. |
| 48(W) | II | 15 | 62.0 | 372 | 52.0 | 7.2 | Do. |
| 49(E) | I | 0 | 63.5 | 323 | 38.5 | 8.4 | Do. |
| 50(W) | III | 30 | 66.5 | 347 | 48.5 | 7.2 | Do. |
| 51(E) | II | 15 | 61.0 | 371 | 43.0 | 8.6 | Do. |
| 52(W) | IV | 45 | 67.0 | 367 | 51.0 | 7.2 | Do. |
| 53(E) | III | 30 | 61.5 | 359 | 48.5 | 7.4 | Do. |
| 54(W) | I | 0 | 62.5 | 365 | 39.5 | 9.2 | Choice. |
| 55(E) | V | 60 | 65.0 | 358 | 46.0 | 7.8 | Low choice. |
| 56(W) | V | 60 | 62.5 | 374 | 45.5 | 8.2 | Prime. |
| 57(E) | I | 0 | 62.5 | 380 | 54.5 | 7.0 | Choice. |
| 58(W) | III | 30 | 70.5 | 388 | 55.0 | 7.1 | Low choice. |
| 59(E) | IV | 45 | 68.0 | 349 | 39.0 | 9.0 | Prime. |
| 60(W) | II | 15 | 68.5 | 363 | 41.5 | 8.8 | Low choice. |

[1] Ewe. [2] Wether.

Table 3b below is a summary of the experiment on a group basis.

TABLE 3b

| Group No. | Average weight gain (lbs.) | Average feed conversion (lbs. feed consumed/lbs. weight gained) | Percent feed efficiency improvement |
|---|---|---|---|
| I | 44 | 8.2 | |
| II | 45 | 8.1 | 1 |
| III | 47 | 7.7 | 6.3 |
| IV | 47 | 7.7 | 6.3 |
| V | 44 | 8.1 | 1 |

EXAMPLE IV

One hundred twenty-eight one-day-old chicks were divided into two groups of 64 chicks per group and placed in starter batteries in a random placement manner which was statistically analyzable for location effects. Each group of 64 birds contained 32 male and 32 female chicks. All chicks were fed the following ration with food and water ad libitum for a period of eight weeks.

| | Percent |
|---|---|
| Alfalfa meal (dehydrated-17% protein) | 1.50 |
| Animal fat | 2.20 |
| Broiler Turkey Permix [1] | 0.50 |
| Calcium carbonate | 1.10 |
| Condensed fermented corn extractives | 4.00 |
| Ground corn | 61.65 |
| Corn gluten meal | 2.50 |
| Defluorinated phosphate | 0.40 |
| Fish meal | 2.35 |
| Hydrolized poultry feathers | 1.00 |
| Meat and bone scraps | 1.00 |
| Methionine | 0.05 |
| Salt | 0.20 |
| 50% soybean meal | 21.45 |
| Trace mineral mix [2] | 0.10 |
| | 100.00 |

[1] Broiler turkey premix contains riboflavin, pantothenic acid, niacin, choline, vitamin K, vitamin $B_{12}$, vitamin A, vitamin $D_3$, vitamin E, penicillin (4 grains per ton), and Santoquin.
[2] Trace mineral mix contains manganous oxide, ferrous carbonate, potassium iodide, cupric oxide, cobalt sulfate, zinc oxide, all of which are distributed on calcium carbonate.

During the first four weeks the rations for one of the groups of 64 contained, in addition to the above, mepenzolate bromide at a concentration of 1750 mg. per hundred pounds of feed, which concentration was selected to give on the average a dose of 2.5 mg. of drug per pound of body weight per day. During the second four weeks the concentration of drug in the feed for the same group of 64 was 2900 mg. per hundred pounds of feed which was also selected to give an average dose of 2.5 mg. of drug per pound of body weight per day. The concentration increased after four weeks because the feed consumed by an average chick per pound of body weight decreases with an increase in weight. The group of 64 not receiving treatment was merely fed the above ration and water ad libitum as a control.

The chicks were weighed at weekly intervals and the amount of feed consumed for each group was recorded. The table below summarizes the results of this experiment.

TABLE 4

| Group No. | No. of chicks surviving 8 weeks | Initial gross weight (grams) | Gross weight gain (grams) | Feed conversion (lbs. feed consumed/lbs. gained) | Overall percent feed efficiency improvement |
|---|---|---|---|---|---|
| I (Control) | 64 | 2,658 | 84,053 | 2.14 [1](1.91) | |
| II (Treated) | 64 | 2,725 | 79,644 | 2.12(1.93) | 0.93(−1.05) |

[1] Figures in parentheses are results after six weeks.

EXAMPLE V

One hundred twenty-eight one-day-old chicks were divided into two groups of 64 chicks per group and placed in starter batteries in a random placement manner which was statistically analyzable for location effects. Each group of 64 birds contained 32 male and 32 female chicks. All chicks were fed the ration described in Example IV and water ad libitum for a period of eight weeks.

During the first four weeks the rations for one of the groups of 64 contained, in addition to the ration, pipenzolate methyl bromide at a concentration of 350 mg. per hundred pounds of feed, which concentration was selected to give on the average a dose of 0.5 mg. of drug per pound of body weight per day. During the second four weeks the concentration of drug in the feed for the same group of 64 was 580 mg. per hundred pounds of feed which was also selected to give an average dose of 0.5 mg. of drug per pound of body weight per day. The concentration was increased after four weeks because the feed consumed by an average chick per pound of body weight decreases with an increase in weight. The group of 64 not receiving treatment was merely fed the ration and water ad libitum as a control.

The chicks were weighed at weekly intervals and the amount of feed consumed for each group was recorded. The table below summarizes the results of this experiment.

TABLE 5

| Group No. | No. of chicks surviving 8 weeks | Initial gross weight (grams) | Gross weight gain (grams) | Feed conversion (lbs. feed consumed/lbs. gained) | Overall percent feed efficiency improvement |
|---|---|---|---|---|---|
| I (Control) | 64 | 2,658 | 84,053 | 2.14 [1](1.91) | |
| II (Treated) | 63 | 2,662 | 84,592 | 2.11(1.82) | 1.4(4.7) |

[1] Figures in parentheses are results after six weeks.

EXAMPLE VI

One hundred twenty-eight one-day-old chicks were divided into two groups of 64 chicks per group and placed in starter batteries in a random placement manner which was statistically analyzable for location effects. Each group of 64 birds contained 32 male and 32 female chicks. All chicks were fed the ration described in Example IV and water ad libitum for a period of six weeks.

During the first four weeks the rations for one of the groups of 64 contained, in addition to the ration, tricyclamol methyl chloride at a concentration of 70 mg. per hundred pounds of feed, which concentration was selected to give on the average a dose of 0.1 mg. of drug per pound of body weight per day. During the second two weeks the concentration of drug in the feed for the same group of 64 was 116 mg. per hundred pounds of feed which was also selected to give an average dose of 0.1 mg. of drug per pound of body weight per day. The concentration was increased after four weeks because the feed consumed by an average chick per pound of body weight decreases with an increase in weight. The group of 64 not receiving treatment was merely fed the ration and water ad libitum as a control.

The chicks were weighed at weekly intervals and the amount of feed consumed for each group was recorded. The table below summarizes the results of this experiment.

TABLE 6

| Group No. | Number of chicks surviving 6 weeks | Initial gross weight (grams) | Gross weight gain (grams) | Feed conversion (lbs. feed consumed/lbs. gained) | Overall percent feed efficiency improvement |
|---|---|---|---|---|---|
| I (Control) | 62 | 2,356 | 57,226 | 1.98 | |
| II (Treated) | 61 | 2,318 | 56,364 | 1.95 | 1.52 |

EXAMPLE VII

One hundred twenty-eight one-day-old chicks were divided into two groups of 64 chicks per group and placed in starter batteries in a random placement manner which was statistically analyzable for location effects. Each group of 64 birds contained 32 male and 32 female chicks. were fed the nation described in Example IV and water ad libitum for a period of eight weeks.

During the first four weeks the rations for one of the groups of 64 contained, in addition to the ration, homatropine at a concentration of 70 mg. per hundred pounds of feed, which concentration was selected to give on the average a dose of 0.1 mg. of drug per pound of body weight per day. During the second four weeks the concentration of drug in the feed for the same group of 64 was 116 mg. per hundred pounds of feed which was also selected to give an average dose of 0.1 mg. of drug per pound of body weight per day. The concentration was increased after four weeks because the feed consumed by an average chick per pound of body weight decreases with an increase in weight. The group of 64 not receiving treatment was merely fed the ration and water ad libitum as a control.

The chicks were weighed at weekly intervals and the amount of feed consumed for each group was recorded. The table below summarizes the results of this experiment.

TABLE 7

| Group No. | Number of chicks surviving 8 weeks | Initial gross weight (grams) | Gross weight gain (grams) | Feed conversion (lbs. feed consumed/lbs. gained) | Overall percent feed efficiency improvement |
|---|---|---|---|---|---|
| I (Control) | 63 | 2,304 | 92,904 | 2.28 [1](2.15) | |
| II (Treated) | 57 | 2,368 | 97,755 | 2.37 (2.04) | −4.0 (5.1) |

[1] Figures in parentheses are results after six weeks.

EXAMPLE VIII

One hundred twenty-eight one-day-old chicks were divided into two groups of 64 chicks per group and placed in starter batteries in a random placement manner which was statistically analyzable for location effects. Each group of 64 birds contained 32 male and 32 female chicks. All chicks were fed the ration described in Example IV and water ad libitum for a period of eight weeks.

During the first four weeks the rations for one of the groups of 64 contained, in addition to the ration, dicylomine hydrochloride at a concentration of 700 mg. per hundred pounds of feed, which concentration was selected to give on the average a dose of 1 mg. of drug per pound of body weight per day. During the second four weeks the concentration of drug in the feed for the same group of 64 was 1160 mg. per hundred pounds of feed which was also selected to give an average dose of 1 mg. of drug per pound of body weight per day. The concentration was increased after four weeks because the feed consumed by an average chick per pound of body weight decreases with an increase in weight. The group of 64 not receiving treatment was merely fed the ration and water ad libitum as a control.

The chicks were weighed at weekly intervals and the amount of feed consumed for each group was recorded. The table below summarizes the results of this experiment.

TABLE 8

| Group No. | Number of chicks surviving 8 weeks | Initial gross weight (grams) | Gross weight gain (grams) | Feed conversion (lbs. feed consumed/lbs. gained) | Overall percent feed efficiency improvement |
|---|---|---|---|---|---|
| I (Control) | 63 | 2,304 | 92,904 | 2.28 [1](2.15) | |
| II (Treated) | 58 | 2,368 | 92,568 | 2.23 (1.97) | 2.3 (9.0) |

[1] Figures in parentheses are results after six weeks.

EXAMPLE IX

One hundred twenty-eight one-day-old chicks were divided into two groups of 64 chicks per group and placed in starter batteries in a random placement manner which was statistically analyzable for location effects. Each group of 64 birds contained 32 male and 32 female chicks. All chicks were fed the ration described in Example IV and water ad libitum for a period of eight weeks.

During the first four weeks the rations for one of the groups of 64 contained, in addition to the ration, piperidolate hydrochloride at a concentration of 700 mg. per hundred pounds of feed, which concentration was selected to give on the average a dose of 1 mg. of drug per pound of body weight per day. During the second four weeks the concentration of drug in the feed for the same group of 64 was 1160 mg. per hundred pounds of feed which was also selected to give an average dose of 1 mg. of drug per pound of body weight per day. The concentration was increased after four weeks because the feed consumed by an average chick per pound of body weight decreases with an increase in weight. The group of 64 not receiving treatment was merely fed the ration and water ad libitum as a control.

The chicks were weighed at weekly intervals and the amount of feed consumed for each group was recorded. The table below summarizes the results of this experiment.

TABLE 9

| Group No. | No. of chicks surviving 8 weeks | Initial gross weight (grams) | Gross weight gain (grams) | Feed conversion (lbs. feed consumed/lbs. gained) | Overall percent feed efficiency improvement |
|---|---|---|---|---|---|
| I (Control) | 63 | 2,304 | 92,904 | 2.28 [1](2.15) | |
| II (Treated) | 59 | 2,323 | 83,160 | 2.22(1.98) | 2.7(8.6%) |

[1] Figures in parentheses are results after six weeks.

EXAMPLE X

Two hundred fifty-six one-day-old chicks were divided into four groups of 64 chicks per group and fed as in Examples IV through IX. Propantheline bromide was used as the drug for three of the groups (Groups II, III, and IV) at three different dosage levels and the other group (Group I) was fed merely the standard ration as a control. The following sets forth the concentration of drug in the feed for each of two four-week periods and the intended average dosage.

TABLE 10

| | First 4 weeks, drug concentration in feed | Second 4 weeks, drug concentration in feed | Intended average dose |
|---|---|---|---|
| Group II | 700 mg./100 lb. feed | 1,160 mg./100 lb. feed | 1.0 mg./lb. body wt./day |
| Group III | 1,050 mg./100 lb. feed | 1,740 mg./100 lb. feed | 1.5 mg./lb. body wt./day |
| Group IV | 1,400 mg./100 lb. feed | 2,320 mg./100 lb. feed | 2.0 mg./lb. body wt./day |

The tables below summarize the experimental results, Table Xa being a summary of weight gain and Table Xb being a summary of feed conversion results.

TABLE Xa.—AVERAGE INCREASE IN CHICK WEIGHT (GRAMS) TO THE END OF WEEK INDICATED

| Week | 1 | 2 | 3 | 4 | 5 | 6 | 7 | 8 |
|---|---|---|---|---|---|---|---|---|
| Group I (Control) | 49.8 | 153 | 302 | 467 | 665 | 870 | 1,111 | 1,355 |
| Group II (1.0 mg.) | 49.3 | 150 | 290 | 439 | 627 | 840 | 1,062 | 1,300 |
| Group III (1.5 mg.) | 52.1 | 156 | 311 | 484 | 707 | 941 | 1,062 | 1,428 |
| Group IV (2.0 mg.) | 52.5 | 154 | 302 | 470 | 672 | 886 | 1,122 | 1,367 |

TABLE Xb.—FEED CONVERSION, WEIGHT OF FEED CONSUMED/WEIGHT GAINED (TO END OF INDICATED WEEK)

| Week | 1 | 2 | 3 | 4 | 5 | 6 | 7 | 8 |
|---|---|---|---|---|---|---|---|---|
| Group I (Control) | 1.74 | 1.61 | 1.69 | 1.79 | 1.98 | 2.06 | 2.12 | 2.16 |
| Group II (1.0 mg.) | 1.75 | 1.64 | 1.73 | 1.83 | 2.08 | 2.12 | 2.14 | 2.27 |
|  | [1](−0.17) | (−2.36) | (−2.56) | (−2.50) | (−5.32) | (−2.89) | (−0.89) | (−5.01) |
| Group III (1.5 mg.) | 1.61 | 1.62 | 1.65 | 1.71 | 1.89 | 1.97 | 2.12 | 2.16 |
|  | (+7.29) | (−1.02) | (+2.44) | (+4.00) | (+4.73) | (+4.51) | (+0.10) | (+0.39) |
| Group IV (2.0 mg.) | 1.56 | 1.57 | 1.66 | 1.76 | 1.96 | 2.05 | 2.12 | 2.15 |
|  | (+10.27) | (+2.24) | (+1.58) | (+1.50) | (+0.81) | (+0.63) | (+0.29) | (+0.34) |

[1] All figures in parentheses are percentage improvements in feed efficiency with respect to the control group.

The above examples were given for illustrative purposes only and should not be interpreted in a limiting sense. Rather the invention should be limited only as indicate in the claims appended hereto.

Having thus described the invention, what is claimed is:

1. An improved growth stimulating composition for animals which comprises an animal feed and an effective amount of a peristalsis-regulating substance contained therein for growth stimulation.

2. The improved composition of claim 1 wherein said substance is propantheline bromide.

3. The improved composition of claim 1 wherein said substance is selected from a group consisting of atropine and derivatives thereof.

4. The improved composition of claim 1 wherein said substance is methantheline bromide.

5. The improved composition of claim 1 wherein said substance is pipenzolate methyl bromide.

6. The improved composition of claim 1 wherein said substance is piperidolate hydrochloride.

7. The composition of claim 1 wherein said animal feed comprises a ruminant feed.

8. The growth stimulating composition of claim 1 wherein said animal feed comprises a poultry feed.

9. The growth stimulating composition of claim 1 wherein said animal feed comprises a hog feed.

10. An improved growth stimulating composition for animals which comprises an animal feed and an effective amount of a peristalsis-inhibiting substance contained therein for growth stimulation, said substance being substantially specific as to smooth gastro-intestinal muscles.

11. The improved composition of claim 10 wherein said substance is propantheline bromide.

12. The improved composition of claim 10 wherein said substance is selected from the group consisting of atropine and derivatives thereof.

13. The feeding composition of claim 1 wherein said peristalsis-regulating substance is selected from the group consisting of atropine, methantheline bromide, aminopentamide sulfate, dibutoline sulfate, dicyclomine hydrochloride, hexocyclium methyl sulfate, isopropamide iodide, methscopolamine bromide, methscopolamine nitrate, oxyphenonium bromide, mepenzolate bromide, penthienate bromide, pipenzolate methylbromide, piperidolate hydrochloride, tricyclamol chloride, valethamate bromide, homatropine, and eucatropine hydrochloride.

14. A method of stimulating animal growth which comprises administering to said animal an effective amount of peristalsis-regulating substance for growth stimulation.

15. The method of claim 14 wherein said substance is propantheline bromide.

16. The method of claim 14 wherein said substance is atropine.

17. The method of claim 14 wherein said substance is methantheline bromide.

18. The method of claim 14 wherein said substance is piperidolate hydrochloride.

19. A method of claim 14 wherein said substance is pipenzolate methyl bromide.

20. The method claim 14 wherein the peristalsis-regulating substance is an anticholinergic agent administered to the animal during its growing period.

21. The method of claim 14 wherein the peristalsis-regulating substance is a peristalsis-inhibiting substance administered during the growing period of the animal.

22. The method of claim 14 wherein the peristalsis-regulating substance is administered to the animal at regular intervals throughout its growing period, said substance being substantially specific as to smooth gastro-intestinal muscles.

23. In a feeding composition for stimulating the growth of animals, the improvement comprising an effective amount of a peristalsis inhibiting substance for stimulating animal growth.

References Cited

Schmidt et al., "Atropine Depression of Food and Water Intake," American Journal of Physiology, vol. 192, pp. 543–45, 1958.

Archdeacon et al., "Effects of Atropine on Dogs," American Journal of Physiology, vol. 157, pp. 149–152, 1949.

Merck Index, 17th ed., pp. 111, 664, 821 823 and 859, Merck and Co., Inc., Rahway, N.J. (1960).

Goodman et al., Pharmacological Basis of Therapeutics, 2nd ed., pp. 558, 559, 562 and 563, MacMillan Co., New York, N.Y. (1955).

Jr. Am. Med. Assoc., pp. 781–2, July 2, 1949.

A. LOUIS MONACELL, Primary Examiner

J. M. HUNTER, Assistant Examiner

U.S. Cl. XR.

424—267, 283